United States Patent [19]

Hestad et al.

[11] 4,167,655
[45] Sep. 11, 1979

[54] PUSH BUTTON TO ROTARY DIAL CONVERTER SYSTEMS

[75] Inventors: Alfred M. Hestad; Jan Synek, both of Chicago, Ill.

[73] Assignee: United Networks Inc., Burbank, Ill.

[21] Appl. No.: 842,393

[22] Filed: Oct. 17, 1977

[51] Int. Cl.² .............................................. H04M 1/44
[52] U.S. Cl. .................................. 179/90 K; 179/84 R
[58] Field of Search .................. 179/90 K, 90 B, 90 R, 179/16 EC, 84 R

[56] References Cited

U.S. PATENT DOCUMENTS

| | | | |
|---|---|---|---|
| 3,856,982 | 12/1974 | Lawson et al. | 179/90 K |
| 3,896,270 | 7/1975 | Kopec et al. | 179/84 R |
| 3,932,707 | 1/1976 | Connolly et al. | 179/90 K |
| 3,956,596 | 5/1976 | Connolly et al. | 179/90 K |
| 3,973,084 | 8/1976 | Hovland | 179/90 K |
| 3,980,837 | 9/1976 | Jakobsson | 179/90 K |
| 4,008,380 | 2/1977 | La Borde | 179/90 K |
| 4,046,971 | 9/1977 | Losehand | 179/90 K |
| 4,081,619 | 3/1978 | Losehand | 179/90 K |

FOREIGN PATENT DOCUMENTS 586493 2/1977 Switzerland ........................ 179/90 K Primary Examiner—Kathleen H. Claffy
Assistant Examiner—Gerald L. Brigance
Attorney, Agent, or Firm—Alter and Weiss

[57] ABSTRACT

A push button to rotary dial converter system for converting push button telephones to provide rotary dial type pulsed outputs. The system provided is universal and can be used with almost any subscriber set that is made to provide push button signals to the telephone system and is especially useful when the telephone system involved is not equipped to receive variable frequency dialing signals. Responsive to the operation of the selected push buttons, pulses are transmitted through the line. The system is unique, among other ways, in that the connection to the network is electronically opened during out pulsing and a parallel power supply arrangement is employed; and it is applicable even when only one pair of hook switche contacts are available, and one side of the pair of hook switch contacts are tied together. The system further includes a bridge circuit for maintaining the polarity on the subscriber set independent of telephone line polarity reversals, a portion of the bridge circuit also being used to prevent operation of the subscriber set ringer in response to the rotary dial type pulses.

5 Claims, 3 Drawing Figures

PUSH BUTTON TO ROTARY DIAL CONVERTER SYSTEMS

The present invention has to do with subscriber stations; and more particularly, with push button to rotary dial converter systems for use in connection with subscriber stations.

Many telephone switching systems are not equipped for, and cannot be easily modified for using tone signals for dialing purposes. Therefore, many companies using telephone switching systems that cannot respond to touch tone type dialing signals are interested in supplying their subscribers with subscriber stations that can provide pulse signals, such as those provided by rotary dials; but, using push button key-pads for keying the digits. Thus, there is presently a need for improved push button to rotary dial converter systems.

There are many available push button to rotary dial converter systems. However, presently available systems have inherent inadequacies. One characteristic of the presently available systems is that they are generally uniquely tailored to one particular subscriber station. For example, there are systems that are designed for subscriber stations wherein the hook switch contacts appear in both the ring and the tip leads. Such systems are not readily adaptable to those subscriber networks wherein only one of the lines is broken by the hook switch. Further, most of the available systems have power supply circuitry contained therein which is in series with the network. Such a series power supply arrangement mitigates against conferencing the telephones.

A known circuit that uses a parallel power supply arrangement is the circuit which is shown in the 1977 MOS/LSI National Semiconductor Data Book. However, that circuit is limited to having hook switch contacts in both lines of the external telephone network. Further, that circuit uses a series 25K resistor which would be across the loop during dialing "break" periods; and accordingly, would not meet the specifications of most telephone systems.

Accordingly, an object of the present invention is to provide new and unique push button to rotary dial converter systems.

A related object of the present invention is to provide push button to rotary dial converter systems that can be utilized with almost all presently manufactured subscriber sets.

A further object of the present invention is to provide push button to rotary dial converter systems that use the latest "chip" technology in a practically universal circuit for furnishing pulses required responsive to selectively operated keys.

Still another object of the present invention is to provide push button to rotary dial converter systems wherein the power supply for operating the system bridges the ring and tip lines rather than being in series with either the ring or the tip lines.

Another object of the present invention is to provide push button to rotary dial converter systems with last number redial and trunk access digit features.

Yet another object of the present invention is to provide push button to rotary dial converter systems which are operative even when polarity is reversed.

Still another object of the present invention is to provide push button to rotary dial converter systems wherein dial clicks are automatically muted or entirely deleted.

Another object of the present invention is to provide push button to rotary dial converter systems wherein the ringer is shunted without the use of hook switch contacts, when dial pulses are transmitted to avoid "ring" signals caused by the dial pulses. This is particularly important in retrofitting old dial type telephones, when hook switch contacts for shunting the ringer are not available.

Yet another object of the present invention is to provide push button to rotary dial converter systems wherein a tone is extended to the receiver when any of the push buttons of the key-pad is operated.

Still another object of the present invention is to provide push button to rotary dial converter systems where the subscriber network is disconnected from the lines during out pulsing.

A preferred embodiment of the present push button to rotary dial converter uses a chip for providing pulses responsive to selectively operated keys on the key-pad. The tip and ring are connected to the pulsing arrangement through a rectifier bridge circuit to account for polarity reversals on the line. Power in the idle condition with the hook switch contacts open is transferred to a parallel capacitor that is charged through a resistor diode arrangement.

In the off hook condition, in the conversation mode, the current flows through the rectifier bridge, a hook switch contact, the receiver transformer, the transmitter to a diode and a high gain-low impedance transistor device.

In the dialing mode, when the digits are keyed with a push button key-pad, a tone is extended to the receivers. The telephone station network is disconnected from the line by switching the high gain-low impedance transistor device to its non-conducting state. The dial pulses from the dial pulse generator circuit are transmitted through a dial pulse gate and control transistor to the line. A second gate is used to control the muting of the pulse "clicks" during transmission of the dial pulses. During the "break" periods in the pulses, the circuit is powered by the charge on the parallel capacitor previously discussed.

Means are provided for preventing transients from operating the circuitry. Further circuitry provides for shunting the ringer to prevent it from operating responsive to the dialing pulses. The circuitry, therefore, provides a tone in the receiver and an output of dial pulses responsive to the operation of selected keys. Additionally, polarity reversal has no effect on the dial circuitry.

The above mentioned and other objects and features of the invention together with the manner of obtaining them will be best understood by making reference to the accompanying drawings, in which.

Figure 1:
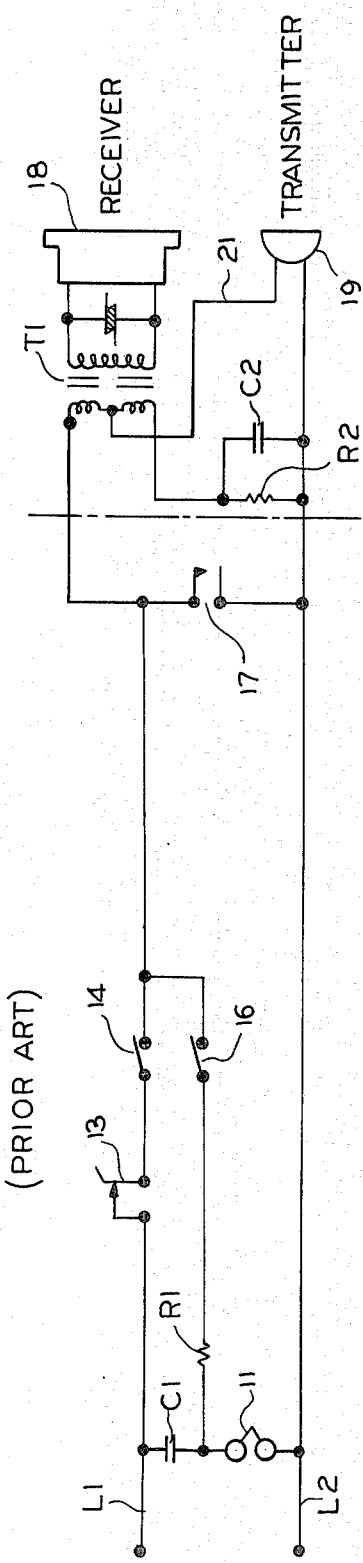
FIG. 1 is a showing of the essential parts of the rotary of a subscriber set equipped with a conventional rotary dial.

The schematic of FIG. 1 is a prior art rotary dialing circuit which shows the tip and ring lines as lines L1 and L2. Bridging lines L1 and L2 is a ringer 11 in series with the ringer capacitor C1. Line L1 has a normally closed dial contact 13 in series with a normally open hook switch contact 14. A second normally open hook switch contact 16 is also coupled to the subscriber stator side of hook switch contact 14. The armature side of hook switch contact 14 is the side connected to the normally closed dial contacts 13. The stator of hook switch contact 16 is coupled to the stator of hook switch contact 14. The armature of hook switch contact 16 is connected in series through resistor R1 to the junction point of capacitor C1 and ringer 11.

A normally open muting contact 17 is connected from line L2 to the stator side of hook switch contacts 14 and 16. The muting contact operates to the closed position, when the rotary dial is moved from its normal position. Thus, whenever a number is dialed, the muting contact is closed until the dial returns to its starting position. The muting contact is designed to prevent irritating clicks from being received by the subscriber through the receiver.

Line L1 is connected to the high side of the primary of transformer T1. The other side of the primary of transformer T1 is connected to the line L2 through resistor R2, bridged by capacitor C2. The secondary of transformer T1 is connected into the receiver 18. The transmitter 19 is connected to the center of the primary of transformer T1 over conductor 21 and to the line L2.

As is well known, when a dial is operated while the phone is off hook, the muting contact closes, and the dial contact pulses to provide the selected number of pulses. The switching system applies a d.c. voltage to the line. This causes a d.c. current to flow through the line, when the phone is off hook. The dial contact (during dialing) causes interruptions of the current corresponding to the digit dialed. While the telephone is on hook, the hook switch contacts are open; and, therefore, operation of the dial contacts cannot provide pulses, because of the open line.

An object of this invention is to provide the same type of pulses on the line as the dial contacts provide, except that these pulses must be generated responsive to the operation of keys in a key-pad. In addition, in order to make the conversion from the push button to rotary dial more universal, means must be provided for assuring that the circuitry operates even under conditions of polarity reversal, and when the number of hook switch contacts is limited, or when a single pair of hook switch contacts is provided with one side of the pair tied together as shown in FIG. 1.

Figure 2:
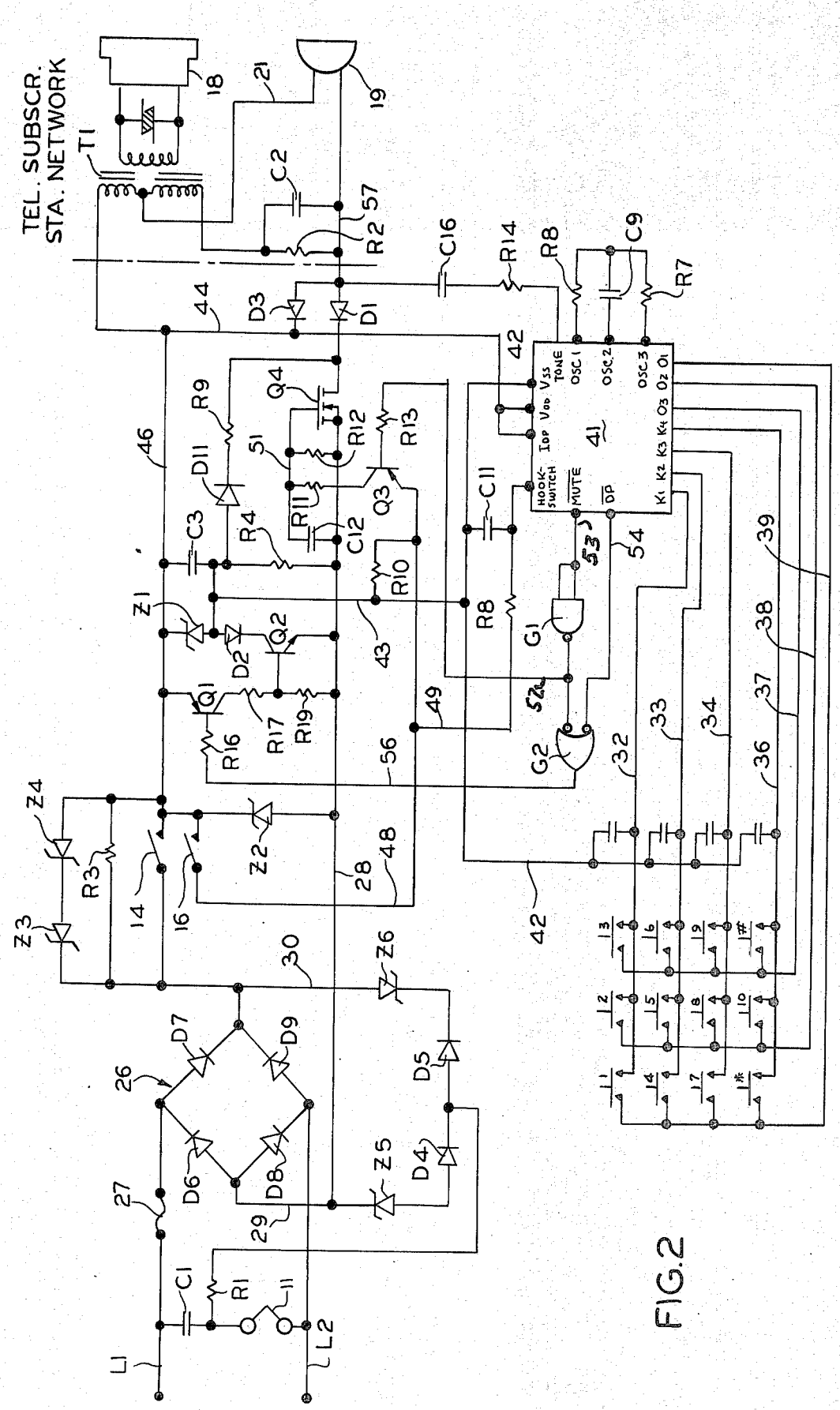
FIG. 2 is the push button to rotary dial conversion.

Accordingly, as shown in FIG. 2, lines L1 and L2 have a ringer and capacitor connected in series thereacross. Since, for purposes of clarity, like numerals are used on FIG. 2 for the components of FIG. 1, the ringer and capacitor are shown as capacitor C1 and ringer 11. The tip and ring lines L1 and L2 are connected to a bridge circuit generally shown as rectifier bridge 26. The rectifier bridge 26 comprises diodes D6, D7, D8 and D9.

Line L1 is connected to the junction of the cathode of diode D6 and the anode of diode D7 through fuse 27. Line L2 is connected directly to the junction of the cathode of diode D8 and the anode of diode D9. The cathode of diode D9 is connected to the cathode of diode D7; while the anodes of diodes D6 and D8 are coupled together.

The fuse 27 is provided because many of the countries which need the circuitry taught herein use telephone plugs which can also be inadvertantly plugged into power sockets. Thus, fuse 27 protects the circuitry from being destroyed, if the telephone is plugged into a power socket.

Hook switch contacts 14 are connected directly to the junction of diodes D7 and D9. Bridging hook switch contacts 14 are a series pair of zener diodes Z3 and Z4. Also, bridging hook switch contact 14 is a resistor R3. The zener diodes Z3 and Z4 in series with zener diode Z2 act to limit the voltage across the bridge. Note that these zener diodes are actually connected between the junction of diodes D7, D9 and D6, D8.

The zener diode Z2 in addition to being part of the voltage limiting circuit for the bridge, also limits the voltage across the transistors Q1, Q2, Q3 and Q4. In the off hook condition the zener diodes Z3 and Z4 are shorted out by the hook switch contact 14; and therefore, the voltage across the bridge is limited to the voltage of zener diode Z2 at that time.

In the idle condition, current flows through the bridge 26 to charge capacitor C3 over a circuit that extends from the positive voltage at the junction of diodes D7, D9 through conductor 30, resistor R3, capacitor C3, resistor R4, conductor 28 and conductor 29 connected to the negative voltage at the junction of diodes D6 and D8. The direction of the current through the bridge depends on the polarity of voltage applied to the line.

Conductor 29 is connected to the zener diode Z5 which connects through diode D4 and resistor R1 to the junction of the ringer 11 and capacitor C1. The junction of diode D4 and resistor R1 is also coupled to the anode of diode D5. The cathode side of diode D5 connects through zener diode Z6 to the junction of diodes D7 and D9. The circuitry, including the zener diodes Z5 and Z6, prevents the attenuation of speech during the conversation mode.

A key-pad 31 is provided. The output of the key-pad comprises leads 32, 33, 34, 36, 37, 38 and 39. Each of the key-pad leads is coupled to a dial pulse generator circuit. This is a commercially available unit which can be purchased, for example, from National Semi-conductor, Model Number MM5393. The National Semi-conductor circuit is a monolithic metal gate CMOS integrated circuit that features, for example, a multi-digit storage and selectable interdigit delays. The chip also provides a 600 Hertz tone.

Each of the key-pad leads 32–36 and 37–39 is coupled to the CMOS gate in a manner so as to store digits therein in accordance with the particular key that has been operated.

The dial pulse generator is identified herein as circuit 41. The schematic shows lead 32 connected to the K1 input of circuit 41. Lead 33 is shown connected to the K2 input of circuit 41. Lead 34 is shown connected to the K3 input of circuit 41. Lead 36 is shown connected to the K4 input of circuit 41. Lead 37 is shown connected to the OA3 output of circuit 41. Lead 38 is shown connected to the OA2 output of circuit 41. Lead 39 is shown connected to the OA1 output of circuit 41. The dial pulsed output of circuit 41 is derived at the DP terminal of circuit 41.

Each of the leads 32–36 is connected to the VSS terminal of circuit 41 through a capacitor, such as capacitor C4 connecting lead 32 to lead 42. Similarly, capacitor C6 connects lead 33 to lead 42. Capacitor C7 connects lead 34 to lead 42; and capacitor C8 connects lead 36 to lead 42.

The VSS terminal is coupled to the negative side of the power supply comprising zener diode Z1 and capacitor C3 through conductors 42 and 43. The dial pulse generator circuit receives power from the positive side of the power supply means over a circuit that includes conductors 44 and 46. Conductor 44 is coupled into the VDD and IDP terminals of the dial pulse generator circuit.

Means are provided for obtaining a desired frequency output from the dial pulse generator circuit 41. This is accomplished by coupling an RC network to the OSC1, OSC2 and OSC3 terminals of the dial pulse generator circuit 41. As shown in the schematic, resistor R6 is coupled to the OSC1 terminal; capacitor C9 is coupled to the OSC2 terminal and resistor R7 is coupled to the OSC3 terminal. All three components are coupled together at the ends opposite the circuit 41.

Means are provided for energizing the power supply in the idle condition. More particularly, in the idle condition, the hook switch contacts 14, 16 are open. Therefore, current flows from line L1 or L2 through the rectifier bridge 26, resistor R3 and conductor 46 to charge capacitor C3. The charge in capacitor C3 is limited by the zener diode Z1. The other side of capacitor C3 is coupled through resistor R4, conductor 28, conductor 29 and through the rectifier bridge 26 to lines L1 or L2.

When the subscriber station goes off hook, the contacts 14 and 16 close. The off hook condition is transmitted to the dial pulse generator circuit 41 over a circuit that extends from positive voltage on line 46 through hook switch contacts 16, conductors 48 and 49, and resistor R8 to the hook switch terminal of the dial pulse generator circuit 41.

Means are provided for preventing transients from generating false hook switch signals. More particularly, filter capacitor C11 is coupled from the junction of hook switch terminal and resistor R8 to conductors 42 and 43 to the negative side of the power supply. At the same time, positive voltage is applied from conductor 46 through hook switch contacts 16 and conductor 48 to the emitter of the normally non-conducting PNP transistor Q3.

The positive voltage on the emitter switches transistor Q3 to its on condition. The emitter of transistor Q3 is coupled to negative voltage through biasing resistor R10 and conductor 43. The collector of transistor Q3 is coupled to the base of high gain transistor means, shown for example as an M channel MOS field effect transistor Q4. The connection is made through resistor R11 and conductor 51. Conductor 51 is connected to conductor 28 through bias resistor R12 and filter capacitor C12.

The base of transistor Q3 is coupled through resistor R13 and conductor 52 to the output of gate G1. The gate is an inverter gate tied to the mute terminal of dial pulse generator circuit 41 through conductor 53. The mate output of the dial pulse generator circuit 41 is normally a high level which goes low when digits are transmitted. Thus, at this point, the high level is inverted by the inverter gate G1 to a low level and transistor Q3 is turned on responsive to the positive voltage at its emitter.

The positive voltage in turn switches the transistor Q4 to its conducting state. The loop current, therefore, flows over the circuit that extends from line L1, the bridge 26, hook switch contacts 14, conductor 46, the network of the subscriber station, diode D1, transistor Q4, conductors 28 and 29, back to the rectifier bridge circuit 26 and line L2. At this point, the subscriber receives dial tone and dials using the key-pad 31.

Responsive to the operation of the keys, a tone is transmitted from the tone terminal of dial pulse generator circuit 41 through a circuit that includes resistor R14, capacitor C16, resistor R2 and the transformer T1 and to the receiver 18 of the subscriber station. At the same time, dial pulses are transmitted from the dial pulse terminal of dial pulse generator circuit 41 through conductor 54 to one input of OR gate G2.

The output of the OR gate is coupled through conductor 56 and resistor R14 to the base of PNP transistor Q1. The signal at the $\overline{DP}$ terminal of circuit 41 is normally high. It goes low responsive to the operation of a key-pad; i.e., the low output occurs during the "break" period of the dial pulses. The output of gate G2 is normally high responsive to either the normally low signal from the gate G1 or the low signal from terminal $\overline{DP}$ during the "break" period; but it goes low responsive to both the high signal from gate G1 and the high signal from the $\overline{DP}$ terminal during the "make" periods of the dial pulses. The low signal thus causes transistor Q1 to switch on during the "make" period of the dial pulses.

The emitter of transistor Q1 is coupled directly to conductor 46. The collector of transistor Q1 is connected to conductor 28 through series resistors R17, R19. The junction of resistors R17 and R19 is coupled directly to the base of NPN transistor Q2.

Transistor Q1 acts as a driver for transistor Q2, although some current does flow through transistor Q1 shunting the lines. Responsive to the drive signals from transistor Q1, transistor Q2 is switched to its conducting condition.

The emitter of transistor Q2 is coupled directly to conductor 28. The collector of transistor Q2 is coupled to the conductor 43 through the series connection of diode D2. The anode of diode D2 is coupled to the anode of zener diode Z1. The junction of the anodes of diode D2 and zener diode Z1 is coupled to the negative side of capacitor C3.

At the same time that digits are transmitted from the digit pulse terminal—the $\overline{DP}$ terminal of circuit 41—the mute signal at the $\overline{MUTE}$ terminal goes low. Therefore, the output of gate G1 goes high, switching off transistor Q4. Thus, the pulse signals do not go through the subscriber network at all, but are instead transmitted through transistors Q1, Q2 and associated circuitry.

The transistors Q1 and Q2 conduct responsive to the "make" period of the dial pulses. During the "break" period of the dial pulses, when transistors Q1, Q2 and Q4 are non-conducting, the loop current is interrupted in the same manner as if the pulses were generated by a rotary dial.

It should be noted that the capacitor C3 is charged to the limited voltage during the "make" period of the dial pulses, when transistors Q1 and Q2 are in the conducting condition. The capacitor maintains adequate voltage to power the circuit during the "break" periods of the dial pulses.

In the conversation mode, after switch through and polarity reversal, the transistors Q1 and Q2 are in the normally off condition, because there are no dial pulses being received and the muting signal, which is normally high is therefore transmitted to the base of transistor Q1 as a high signal, after going through gates G1 and G2. After there are no more dial pulses, then the normally high signal from the mute terminal, in conjunction with the positive voltage through hook switch 16, again turns on transistor Q3, which in turn turns on transistor Q4. Therefore, current passes through the network and transistor Q4.

The capacitor C12 filters spikes and prevents the spikes from being coupled back to the network during the out pulsing of the digits. A diode D3 coupled between the conductor 57 from the transmitter and conductor 44 clamps the voltage across the subscriber network. Positive spikes which would be generated when transistor Q4 is switched off could destroy transistor Q4, if diode D3 were not there.

During conversation, the capacitor C3 is charged through diode D11 and resistor R9. The diode D11 prevents the capacitor C3 from being discharged through the subscriber network during dialing and also during interruptions in the loop current, which may occur in the switching system to which the telephone is connected. The diode D2 prevents the capacitor C3 from being discharged through the subscriber network, diode D1, transistor Q4, resistor R19 and the base to collector junction of transistor Q2.

Means are provided for suppressing the ringer during the transmission of dial signals. More particularly, the ringer is coupled to diodes D4 and D5 through resistor R1. The anode of diode D5 is coupled to the cathode of diode D4. The anode of diode D4 is coupled to the anode of zener diode Z5. The cathode of diode D5 is coupled to the cathode of zener diode Z6. The cathode of zener diode Z5 is coupled to the junction of diodes D6 and D8 of the rectifier bridge through conductor 29. The anode of zener diode Z6 is coupled to the junction of diodes D7 and D9 of the rectifier bridge through conductor 30.

Assuming that the switching system applies negative voltage to the L2 lead of the line, then during the "make" period of the dial pulses, a negative pulse is coupled via capacitor C1 to the ringer. The ringer, however, is shunted by resistor R1 through diode D4, zener diode Z5 and diode D8 of the bridge. During the "make" period of the dial pulse the loop current is passed through diode D8; and therefore, negative current can be coupled through without turning diode D8 off.

During the "break" period of the dial pulses, positive pulses are coupled through capacitor C1 to the ringer. However, this does not normally effect the ringer, since generally a full cycle is necessary to activate the ringer.

If the switching system to which the telephone is connected reverses the polarity of the line by applying a negative voltage on the L1 lead of the line, then during the "make" period of the dial pulses, a positive pulse is coupled via capacitor C1 to the ringer. Under this condition the ringer is shunted by resistor R1, the circuit including diode D5, zener diode Z6 and diode D9 to line L2.

During the "make" period of the dial pulse, the loop current is passed through diode D9; and, therefore, positive current can be coupled through the diode D9 without turning diode D9 off. In this case negative pulses are coupled through capacitor C1 to the ringer during the "break" period, but this does not cause the ringer to ring because the positive part of the cycle is suppressed.

Figure 3:
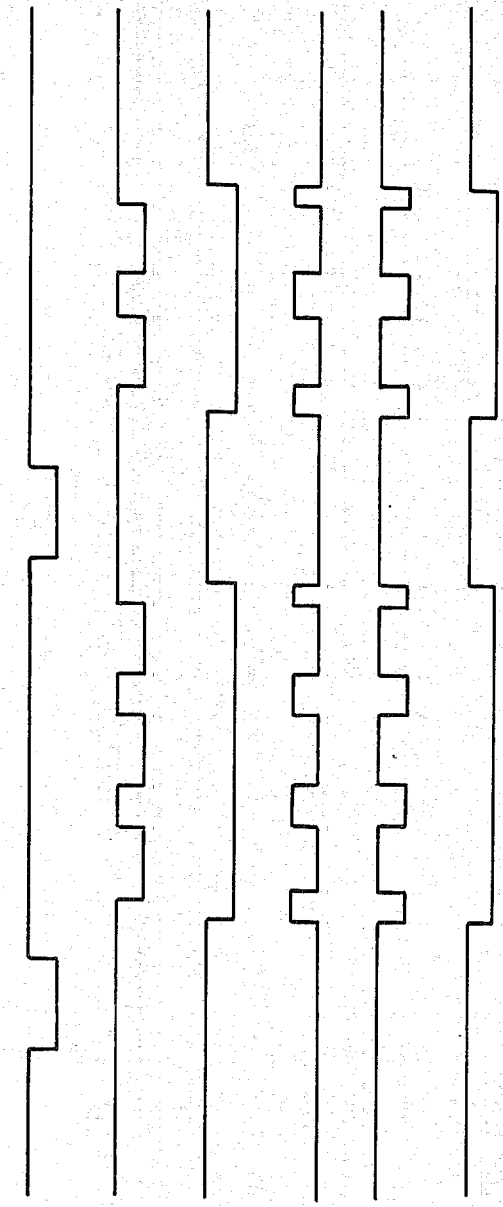
FIG. 3 is a timing diagram showing the relationship between the closure of the keys, the dial pulses, the muting signal and the operation of transistors Q1, Q2, Q3 and Q4.

FIG. 3 is a timing diagram showing the relationship between the closure of the key, the dialed pulses, the muting pulse, the collectors of transistors Q1, Q2 and the source of transistor Q4. Shortly after the closure of the key, the muting signal is transmitted. Additionally, transistor Q3 is switched to its operating conducting condition. Also, responsive to the closure of the key, the collector of transistor Q1 goes high, while the collector of transistor Q2 goes low. The dial pulse, which is normally high, then goes low and drives the collector of transistor Q1 low and the collector of transistor Q2 high. Responsive to the high signal from gate G1 and the consequent operation of transistor Q3 to its nonconducting state, transistor Q4 is turned off. Thus, the source of transistor Q4 follows the muting signal and transistor Q3. The collector of transistor Q1 follows the dial pulse and the collector of transistor Q2 is opposite the dial pulse transmitted from the dial pulse generator circuit.

An effective redialing system is provided. The dial pulse generator circuit 41 "remembers" the last number dialed, even after the telephone handset goes on hook. If subsequently the handset is removed from the hook switch, and the key number is operated, then the stored number is out pulsed. More particularly, the MUTE gate signal goes low, and the DP signal pulses low and high. Consequently, the output of gate G1 goes high, and the output of gate G2 pulses high and low. The high output of gate G1 switches off transistor elements Q3 and Q4, while the low pulse output of gate G2 switches on transistors Q1 and Q2 to out pulse the stored previously dialed digit.

Thus, a unique universal push-button to rotary dial conversion system is provided using the latest integrated dial pulse source. The system features a parallel power circuitry and disconnects the subscriber network during dialing to minimize power drainage and automatically mute the dial pulses at the receiver.

While the principles of the invention have been described above in connection with specific apparatus and applications it is to be understood that this description is made by way of example only and not as a limitation on the scope of the invention.

We claim:

1. A push button to rotary dial converter arrangement for converting a push button telephone to provide rotary type pulse outputs on telephone lines, said system comprising telephone subscriber set means including:

subscriber station network means, hook switch means for disconnecting said network from the telephone lines in the on hook condition and for connecting said network means to the telephone lines in the off hook condition, a push button key pad having key means, dial pulse generator means operated responsive to the operation of selected key means for producing desired numbers of dial pulses when said subscriber set means is in the off hook condition, said hook switch means comprising a first set of contacts in series with one of said telephone lines going to the network means, power supply means in parallel with said subscriber station network means for supplying power to said system, said power supply means comprising a power supply capacitor in series with a power supply resistor coupled across said telephone lines, means for connecting said dial pulse generator means across said power supply capacitor, a second set of contacts on said hook switch means for indicating to said dial pulse generator the condition of said hook switch, blocking means operated responsive to the said second set of contacts being in the on hook condition for blocking the other of said telephone lines attached to the network means, said last named means also acting responsive to said dial pulses for blocking the other of said telephone lines attached to the network means, thereby disconnecting said network from the telephone lines, and bridge circuit means for maintaining the polarity on the telephone subscriber set means independent of polarity reversal of said telephone lines, means for preventing speech attenuation by said bridge circuit means, said subscriber set means including ringer means, means bridging said ringer means including components of said bridge circuit means for preventing operation of said ringer means responsive to the dial pulses.

2. The push button to rotary dial converter system of claim 1 wherein said dial pulse generator means comprises integrated circuitry, said integrated circuitry providing muting signals of characteristic amplitude, means in said integrated circuitry for varying the amplitude of said muting signal responsive to the operation of said key means, said blocking means comprising solid state switching means in series with one of said telephone lines for connecting said network to said telephone lines responsive to the off hook condition, and means responsive to said change in amplitude of said muting signal for causing said solid state switching means to disconnect said telephone network from said telephone lines during out pulsing of said dial pulses.

3. The push button to rotary dial converter system of claim 2 wherein first transistor means are provided, means for operating said first transistor means to the conducting state responsive to the off hook condition and said muting signals, inverter gate means operated responsive to said change in amplitude of said muting signal to cause said first transistor to switch to its non-conducting state, and said solid-state switching means operated responsive to said first transistor means switching to its non-conducting state for causing said solid state switching means to disconnect said network means from said telephone lines.

4. A push button to rotary dial converter arrangement for converting push button telephones to provide rotary dial type pulsed outputs on telephone lines of telephone systems, said arrangement comprising telephone subscriber set means including:

subscriber station network means;

hook switch means including one set of contacts in one of the at least two telephone lines connecting said network means to the telephone lines in the off hook condition;

a push button key pad having key means, dial pulse generator means operated responsive to the operation of selected key means for producing desired numbers of dial pulses when said subscriber set means is in the off hook condition, said dial pulse generator means providing a muting signal along with said dial pulses;

means responsive to the muting signal for electronically disconnecting said network from the telephone lines, parallel power supply means across said telephone lines, said parallel power supply means comprising capacitor means briding said lines on the network side of said hook switch means, means for supplying power to said capacitor means, even when said hook switch means is in the on hook condition, and bridge circuit means for maintaining the polarity on the telephone subscriber set means independent of polarity reversal of said telephone lines, means for preventing speech attenuation by said bridge circuit means, said subscriber set means including ringer means, means bridging said ringer means including components of said bridge circuit means for preventing operation of said ringer means responsive to the dial pulses.

5. The push button to rotary dial converter of claim 4 wherein said hook switch means comprises only two sets of contacts where one side of each of the two sets of contacts are tied inseparably together.

* * * * *